United States Patent
Wong et al.

(10) Patent No.: US 11,165,355 B2
(45) Date of Patent: Nov. 2, 2021

(54) CLAMPING SWITCH ABNORMALITY DETECTION METHOD, CLAMPING SWITCH ABNORMALITY DETECTION CIRCUIT AND SWITCH CIRCUIT

(71) Applicant: Joulwatt Technology (Hangzhou)Co., LTD., Hangzhou (CN)

(72) Inventors: Pitleong Wong, Hangzhou (CN); Xianghua Jiang, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 64 days.

(21) Appl. No.: 16/784,267

(22) Filed: Feb. 7, 2020

(65) Prior Publication Data
US 2021/0152094 A1    May 20, 2021

(30) Foreign Application Priority Data
Nov. 15, 2019    (CN) .......................... 201911119707.3

(51) Int. Cl.
*H02M 3/335* (2006.01)
*H02M 1/08* (2006.01)
*H02M 1/32* (2007.01)

(52) U.S. Cl.
CPC ......... *H02M 3/33569* (2013.01); *H02M 1/08* (2013.01); *H02M 1/32* (2013.01)

(58) Field of Classification Search
CPC ...... H02M 3/33569; H02M 1/08; H02M 1/32; G01R 31/2633; G01R 31/2843
See application file for complete search history.

(56) References Cited

U.S. PATENT DOCUMENTS

| | | | |
|---|---|---|---|
| 2021/0021199 A1* | 1/2021 | Liu | ........................ H02M 1/08 |
| 2021/0058002 A1* | 2/2021 | Wong | ................ H02M 3/33592 |

* cited by examiner

*Primary Examiner* — Kyle J Moody
(74) *Attorney, Agent, or Firm* — Bayramoglu Law Offices LLC (57) ABSTRACT

A clamping switch abnormality detection method, a clamping switch abnormality detection circuit and a switch circuit are provided, wherein an active clamping flyback circuit includes a clamping switch, a main switch and a transformer. When a clamping switch control signal is active, a switching node voltage or a voltage on an auxiliary winding or an magnetizing inductor current is detected, and when the switching node voltage or the voltage on the auxiliary winding or the magnetizing inductor current oscillates, or the switching node voltage is less than a first voltage threshold or the voltage on the auxiliary winding is less than a second voltage threshold, the clamping switch is abnormal or a clamping switch driving circuit is abnormal. The switching node is a common node of the transformer and the main switch, and the transformer includes a primary winding, a secondary winding and the auxiliary winding.

20 Claims, 7 Drawing Sheets

CLAMPING SWITCH ABNORMALITY DETECTION METHOD, CLAMPING SWITCH ABNORMALITY DETECTION CIRCUIT AND SWITCH CIRCUIT

CROSS REFERENCE TO THE RELATED APPLICATIONS

This application is based upon and claims priority to Chinese Patent Application No. 201911119707.3, filed on Nov. 15, 2019, the entire contents of which are incorporated herein by reference.

TECHNICAL FIELD

The present invention relates to the technical field of power electronics, and more particularly relates to a clamping switch abnormality detection method, a clamping switch abnormality detection circuit, and a switch circuit.

BACKGROUND

Figure 1:
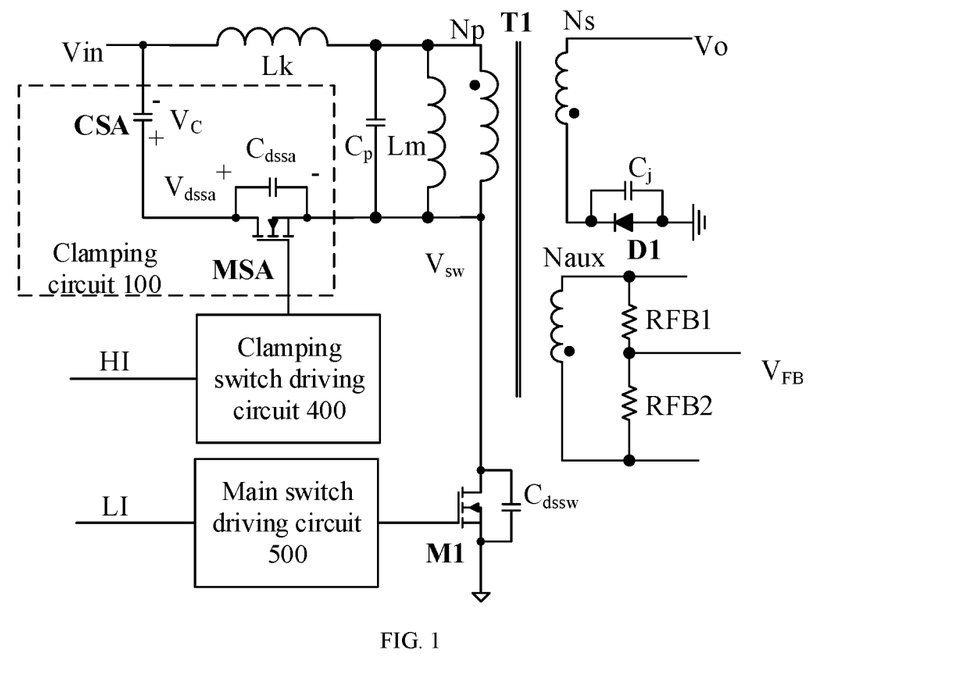
FIG. 1 is a schematic diagram of an active clamping flyback circuit.

FIG. 1 is a schematic diagram of an active clamping flyback circuit. The active clamping flyback circuit includes the clamping circuit 100, and the clamping circuit 100 includes the clamping switch MSA and the clamping capacitor CSA. The clamping switch driving circuit 400 receives the clamping switch control signal HI and controls turning on and off of the clamping switch. When the clamping switch or the clamping switch driving circuit 400 is damaged, the active clamping flyback circuit can still operate in several switching cycles, but the voltage VC on the clamping capacitor CSA will rise. When the voltage VC on the clamping capacitor CSA rises above the maximum rating voltage of the clamping capacitor CSA, the clamping capacitor will be damaged, resulting in damage to the entire flyback circuit. In the prior art, a clamping diode is connected in parallel on the clamping capacitor CSA, so that when the voltage VC on the clamping capacitor CSA is clamped below the maximum rating voltage of the clamping capacitor CSA by the clamping diode without damage to the entire flyback circuit. However, when the clamping switch or the clamping switch driving circuit 400 is damaged, there will be large power consumption on the clamping diode, resulting in degradation of system efficiency.

Therefore, an important issue is to detect whether the clamping switch and the clamping switch driving circuit are normal or not in the active clamping flyback circuit.

SUMMARY

In view of the above issue, an objective of the present invention is to provide a clamping switch abnormality detection method, a clamping switch abnormality detection circuit and a switching circuit, so as to solve the problem in the prior art that when the clamping switch or the clamping switch driving circuit is damaged, there will be large power consumption on the clamping diode, resulting in degradation of system efficiency.

The present invention provides a clamping switch abnormality detection method, wherein an active clamping flyback circuit includes a clamping switch, a main switch and a transformer; when a clamping switch control signal is active, a switching node voltage or a voltage on an auxiliary winding or an magnetizing inductor current is detected; when the switching node voltage or the voltage on the auxiliary winding or the magnetizing inductor current oscillates, or the switching node voltage is less than a first voltage threshold or the voltage on the auxiliary winding is less than a second voltage threshold, the clamping switch is abnormal or a clamping switch driving circuit is abnormal; a switching node is a common node of the transformer and the main switch; the transformer includes a primary winding, a secondary winding and the auxiliary winding; and the voltage on the auxiliary winding is divided to obtain a feedback voltage characterizing the voltage on the auxiliary winding; alternatively, the auxiliary winding is connected on a first resistor to obtain a feedback current characterizing the voltage on the auxiliary winding.

As an option, the active clamping flyback circuit operates in discontinuous conduction mode, and the clamping switch is turned on separately before the main switch is turned on and after the main switch is turned off; the voltage on the auxiliary winding or the switching node voltage is detected when the clamping switch control signal is active before the main switch is turned on; when the switching node voltage for successive Q switching cycles is less than the first voltage threshold, or the voltage on the auxiliary winding is less than the second voltage threshold, the clamping switch or the clamping switch driving circuit is abnormal, wherein Q is a natural number greater than or equal to 1.

As an option, the active clamping flyback circuit operates in critical conduction mode or discontinuous conduction mode, and the clamping switch control signal changes from inactive to active after the main switch is turned off; in every M switching cycles, one switching cycle is that when the magnetizing inductor current is zero, timing is started, and when the timing reaches a first time, the clamping switch control signal changes from active to inactive, and the timing is ended;

during the timing, the voltage on the auxiliary winding or the switching node voltage or the magnetizing inductor current is detected, and if the voltage on the auxiliary winding or the switching node voltage or the magnetizing inductor current is detected to oscillate, then the clamping switch is abnormal or the clamping switch driving circuit is abnormal, otherwise the clamping switch and the clamping switch driving circuit are normal;

alternatively, during the timing, the voltage on the auxiliary winding or the switching node voltage or the magnetizing inductor current is detected, and if the voltage on the auxiliary winding or the switching node voltage or the magnetizing inductor current is detected to oscillate, then in subsequent P switching cycles, the clamping switch control signal changes from inactive to active after the main switch is turned off; when the magnetizing inductor current is zero, the timing is started, and when the timing reaches the first time, the clamping switch control signal changes from active to inactive, and the timing is ended; in successive P+1 switching cycles, during the timing, the voltage on the auxiliary winding or the switching node voltage or the magnetizing inductor current is detected, and if the voltage on the auxiliary winding or the switching node voltage or the magnetizing inductor current is detected to oscillate, then the clamping switch is abnormal or the clamping switch driving circuit is abnormal;

wherein both M and P are natural numbers greater than or equal to 1.

As an option, the active clamping flyback circuit operates in critical conduction mode, and the clamping switch control signal changes from inactive to active after the main switch is turned off; a time when the clamping switch control signal changes from active to inactive is adjusted, so that the main switch achieves zero-voltage switching; when the clamping switch control signal is active, the voltage on the auxiliary winding or the switching node voltage or the magnetizing inductor current is detected; when the voltage on the auxiliary winding does not oscillate or the switching node voltage does not oscillate or the magnetizing inductor current does not oscillate, the clamping switch and the clamping switch driving circuit are normal, otherwise the clamping switch or the clamping switch driving circuit is abnormal.

As an option, the active clamping flyback circuit operates in critical conduction mode or discontinuous conduction mode, and the clamping switch control signal changes from inactive to active after the main switch is turned off; in M−1 cycles of every M switching cycles, the clamping switch control signal changes from active to inactive in the vicinity of the magnetizing inductor current being zero; in one switching cycle of the every M switching cycles, the time when the clamping switch control signal changes from active to inactive is delayed by a third time; when the clamping switch control signal is active, if the voltage on the auxiliary winding or the switching node voltage or the magnetizing inductor current is detected to oscillate, then the clamping switch is abnormal or the clamping switch driving circuit is abnormal, otherwise the clamping switch and the clamping switch driving circuit are normal;

alternatively, when the clamping switch control signal is active, if the voltage on the auxiliary winding or the switching node voltage or the magnetizing inductor current is detected to oscillate, then in subsequently successive P switching cycles, the time when the clamping switch control signal changes from active to inactive is delayed by the third time; in successive P+1 switching cycles, when the clamping switch control signal is active, if the voltage on the auxiliary winding or the switching node voltage or the magnetizing inductor current is detected to oscillate, then the clamping switch is abnormal or the clamping switch driving circuit is abnormal;

wherein M and P are natural numbers greater than or equal to 1.

As an option, when a duty ratio of the main switch is greater than a first threshold value, abnormality detection of the clamping switch is started.

As an option, the active clamping flyback circuit includes a clamping capacitor, and a voltage on the clamping capacitor is a clamping voltage; when the clamping voltage or an output voltage is greater than a fifth voltage threshold, the abnormality detection of the clamping switch is started.

As an option, when the clamping switch or the clamping switch driving circuit is abnormal, both the main switch and the clamping switch are turned off; after a time when both the main switch and the clamping switch are turned off reaches a fourth time, the main switch and the clamping switch are controlled to be turned on again; alternatively, when the clamping switch or the clamping switch driving circuit is abnormal, both the main switch and the clamping switch are turned off, and when being powered on again, the main switch and the clamping switch are controlled to be turned on.

The present invention further provides a clamping switch abnormality detection circuit, wherein an active clamping flyback circuit includes a clamping switch, a main switch and a transformer; when a clamping switch control signal is active, the clamping switch abnormality detection circuit detects a switching node voltage or an voltage on an auxiliary winding or an magnetizing inductor current; when the switching node voltage or the voltage on the auxiliary winding or the magnetizing inductor current oscillates, or the switching node voltage is less than a first voltage threshold or the voltage on the auxiliary winding is less than a second voltage threshold, the clamping switch abnormality detection circuit determines that the clamping switch is abnormal or a clamping switch driving circuit is abnormal; a switching node is a common node of the transformer and the main switch; the transformer includes a primary winding, a secondary winding and the auxiliary winding; and the voltage on the auxiliary winding is divided to obtain a feedback voltage characterizing the voltage on the auxiliary winding; alternatively, the clamping switch abnormality detection circuit is connected to the auxiliary winding through a first resistor to obtain a feedback current characterizing the voltage on the auxiliary winding.

As an option, the clamping switch abnormality detection circuit includes a comparison circuit and a clamping switch abnormality determination circuit; an output voltage of the clamping switch abnormality determination circuit is a clamping switch abnormal signal; the comparison circuit receives the voltage on the auxiliary winding or the switching node voltage; the clamping switch abnormality determination circuit receives an output voltage of the comparison circuit and determines whether the clamping switch and the clamping switch driving circuit are abnormal or not; when the clamping switch or the clamping switch driving circuit is abnormal, the clamping switch abnormal signal is active, otherwise the clamping switch abnormal signal is inactive; and a control circuit for the clamping switch and the main switch receives the clamping switch abnormal signal, and controls turning on and off of the main switch and the clamping switch.

As an option, the active clamping flyback circuit operates in discontinuous conduction mode, and the clamping switch is turned on separately before the main switch is turned on and after the main switch is turned off; when the clamping switch control signal is active before the main switch is turned on, the comparison circuit compares the voltage on the auxiliary winding with the first voltage threshold, or compares the switching node voltage with the second voltage threshold; when the switching node voltage for successive Q switching cycles is less than the first voltage threshold, or the voltage on the auxiliary winding is less than the second voltage threshold, the output voltage of the clamping switch abnormality determination circuit is active, thereby determining that the clamping switch or the clamping switch driving circuit is abnormal, wherein Q is a natural number greater than or equal to 1.

As an option, the clamping switch abnormality detection circuit includes an inductor current detection circuit; the inductor current detection circuit receives the voltage on the auxiliary winding, and determines whether an inductor current is zero or not according to the voltage on the auxiliary winding; the clamping switch abnormality determination circuit outputs a clamping switch extended conduction signal, and the control circuit for the clamping switch and the main switch receives the clamping switch extended conduction signal; when the clamping switch extended conduction signal is active, the control circuit for the clamping switch and the main switch delays a time when the clamping switch control signal changes from active to inactive;

the active clamping flyback circuit operates in critical conduction mode or discontinuous conduction mode, and the clamping switch control signal changes from inactive to active after the main switch is turned off; in every M switching cycles, one switching cycle is that when the inductor current detection circuit detects that the magnetizing inductor current is zero, the control circuit for the clamping switch and the main switch receives the clamping switch extended conduction signal outputted from the clamping switch abnormality determination circuit, and the clamping switch abnormality determination circuit starts timing, and when the timing reaches a first time, the control circuit for the clamping switch and the main switch controls the clamping switch control signal to change from active to inactive, and the timing is ended;

during the timing, the comparison circuit detects the voltage on the auxiliary winding or the switching node voltage, and if the voltage on the auxiliary winding or the switching node voltage is detected to oscillate, or the inductor current detection circuit detects that the magnetizing inductor current oscillates, then the clamping switch abnormal signal is active, thereby determining that the clamping switch is abnormal or the clamping switch driving circuit is abnormal; otherwise, the clamping switch abnormal signal is inactive, thereby determining that the clamping switch and the clamping switch driving circuit are normal;

alternatively, during the timing, the comparison circuit detects the voltage on the auxiliary winding or the switching node voltage, and if the voltage on the auxiliary winding or the switching node voltage is detected to oscillate, or the inductor current detection circuit detects that the magnetizing inductor current oscillates, then in subsequently successive P switching cycles, the clamping switch control signal changes from inactive to active after the main switch is turned off; when the inductor current detection circuit detects that the magnetizing inductor current is zero, the clamping switch abnormality determination circuit starts timing, and when the timing reaches the first time, the control circuit for the clamping switch and the main switch controls the clamping switch control signal to change from active to inactive, and the timing is ended; in successive P+1 switching cycles, during the timing, the voltage on the auxiliary winding or the switching node voltage is detected, and if the voltage on the auxiliary winding or the switching node voltage is detected to oscillate, or the inductor current detection circuit detects that the magnetizing inductor current oscillates, then the clamping switch abnormal signal is active, thereby determining the clamping switch is abnormal or the clamping switch driving circuit is abnormal;

wherein both M and P are natural numbers greater than or equal to 1.

As an option, the active clamping flyback circuit operates in critical conduction mode, and the clamping switch control signal changes from inactive to active after the main switch is turned off; the control circuit for the clamping switch adjusts the time when the clamping switch control signal changes from active to inactive, so that the main switch achieves zero-voltage switching; when the clamping switch control signal is active, the comparison circuit detects the voltage on the auxiliary winding or the switching node voltage, or the inductor current detection circuit detects the magnetizing inductor current; when the voltage on the auxiliary winding does not oscillate or the switching node voltage does not oscillate or the magnetizing inductor current does not oscillate, the clamping switch abnormal signal is inactive, thereby determining that the clamping switch and the clamping switch driving circuit are normal, otherwise the clamping switch abnormal signal is active, thereby determining that the clamping switch or the clamping switch driving circuit is abnormal.

As an option, the clamping switch abnormality determination circuit outputs a clamping switch extended conduction signal, and the control circuit for the clamping switch and the main switch receives the clamping switch extended conduction signal; when the clamping switch extended conduction signal is active, the control circuit for the clamping switch and the main switch delays the time when the clamping switch control signal changes from active to inactive;

the active clamping flyback circuit operates in critical conduction mode or discontinuous conduction mode, and the clamping switch control signal changes from inactive to active after the main switch is turned off; in M−1 cycles of every M switching cycles, the clamping switch control signal changes from active to inactive in the vicinity of the magnetizing inductor current being zero; in one switching cycle of the every M switching cycles, the clamping switch extended conduction signal is active, the time when the clamping switch control signal changes from active to inactive is delayed by a third time; when the clamping switch control signal is active, if the comparison circuit detects that the voltage on the auxiliary winding or the switching node voltage oscillates, or the inductor current detection circuit detects that the magnetizing inductor current oscillates, then the clamping switch abnormal signal is active, thereby determining that the clamping switch is abnormal or the clamping switch driving circuit is abnormal, otherwise the clamping switch abnormal signal is inactive, thereby determining that the clamping switch and the clamping switch driving circuit are normal;

alternatively, when the clamping switch control signal is active, if the comparison circuit detects that the voltage on the auxiliary winding or the switching node voltage oscillates, or the inductor current detection circuit detects that the magnetizing inductor current oscillates, then in subsequently successive P switching cycles, the time when the clamping switch control signal changes from active to inactive is delayed by the third time; in successive P+1 switching cycles, when the clamping switch control signal is active, if the voltage on the auxiliary winding or the switching node voltage is detected to oscillate, or the inductor current detection circuit detects that the magnetizing inductor current oscillates, then the clamping switch abnormal signal is active, thereby determining that the clamping switch is abnormal or the clamping switch driving circuit is abnormal;

wherein both M and P are natural numbers greater than or equal to 1.

As an option, when a duty ratio of the main switch is greater than a first threshold value, the clamping switch abnormality detection circuit is started.

As an option, the active clamping flyback circuit includes a clamping capacitor, and a voltage on the clamping capacitor is a clamping voltage; when the clamping voltage or an output voltage is greater than a fifth voltage threshold, the abnormality detection of the clamping switch is started.

As an option, when the clamping switch or the clamping switch driving circuit is abnormal, the control circuit for the clamping switch and the main switch turns off both the main switch and the clamping switch; after a time when both the main switch and the clamping switch are turned off reaches a fourth time, the control circuit for the clamping switch and the main switch controls the main switch and the clamping switch to be turned on again; alternatively, when the clamping switch or the clamping switch driving circuit is abnormal, the control circuit for the clamping switch and the main switch turns off both the main switch and the clamping switch, and when being powered on again, the control circuit for the clamping switch and the main switch controls the main switch and the clamping switch to be turned on.

The present invention further provides a switch circuit.

Compared with the prior art, the circuit structure and method of the present invention have the advantage of accurately detecting whether the clamping switch or the clamping switch driving circuit is damaged or not, thereby improving system reliability.

DETAILED DESCRIPTION OF THE EMBODIMENTS

Hereinafter, preferred embodiments of the present invention are described in detail with reference to the drawings, but the present invention is not merely limited to these embodiments. The present invention covers any substitutions, modifications, equivalent methods, and schemes made within the spirit and scope of the present invention.

In order to make the public have a thorough understanding of the present invention, specific details are described in the following preferred embodiments of the present invention, and those skilled in the art can fully understand the present invention without the description of these details.

The present invention are described in more detail by way of embodiment in the following paragraphs with reference to the drawings. It should be noted that the drawings each are in a simplified form and use inaccurate proportions, and are only used to facilitate and clearly assist the description of the embodiments of the present invention.

Figure 2:
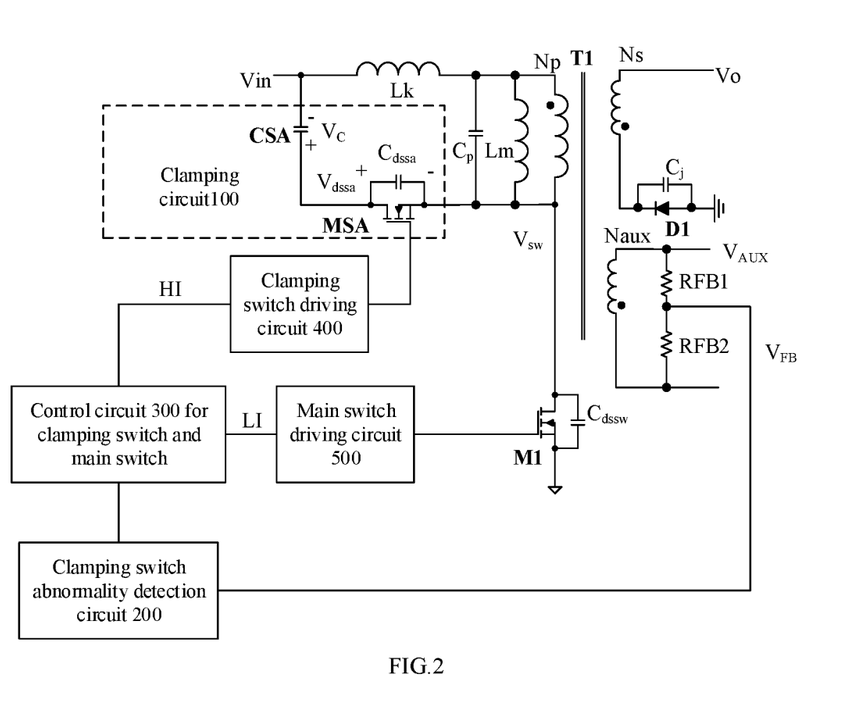
FIG. 2 is a schematic diagram of an active clamping flyback circuit with the clamping switch abnormality detection circuit 200 and the control circuit for the clamping switch and the main switch 300.

The present invention provides a clamping switch abnormality detection circuit. As shown in FIG. 2, the active clamping flyback circuit includes the clamping switch MSA, the main switch M1 and the transformer T1. When the clamping switch control signal HI is active, the clamping switch abnormality detection circuit 200 detects the switching node voltage $V_{SW}$, or the voltage $V_{AUX}$ on the auxiliary winding, or the magnetizing inductor current $i_{LM}$. When the switching node voltage $V_{SW}$, or the voltage $V_{AUX}$ on the auxiliary winding, or the magnetizing inductor current $i_{LM}$ oscillates, or when the switching node voltage $V_{SW}$ is less than a first voltage threshold, or when the voltage $V_{AUX}$ on the auxiliary winding is less than a second voltage threshold, the clamping switch abnormality detection circuit 200 determines that the clamping switch is abnormal or the clamping switch driving circuit is abnormal. The switching node $V_{SW}$ is the common node of the transformer T1 and the main switch M1. The transformer T1 includes the primary winding Np, the secondary winding Ns, and the auxiliary winding Naux. The voltage $V_{AUX}$ on the auxiliary winding is divided to obtain the feedback voltage $V_{FB}$. Since the voltage $V_{AUX}$ on the auxiliary winding may be relatively high and may reach tens of volts, and the clamping switch abnormality detection circuit generally performs the low-voltage sampling, for example, less than 5V, a voltage division method is usually adopted, and the feedback voltage $V_{FB}$ is adopted to characterize the voltage $V_{AUX}$ on the auxiliary winding.

Figure 3:
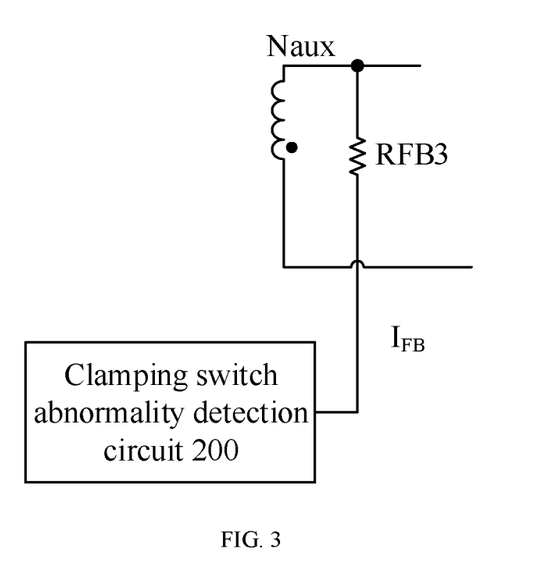
FIG. 3 is an implementation of detecting a voltage on a auxiliary winding in an embodiment.

FIG. 3 is another schematic diagram for detecting the voltage on the auxiliary winding. The feedback voltage $V_{FB}$ may reach a negative voltage, while the clamping switch abnormality detection circuit 200 is more convenient to detect a positive voltage than to detect a negative voltage. Therefore, another way of detecting the voltage on the auxiliary winding is to connect the auxiliary winding to the clamping switch abnormality detection circuit 200 via the resistor RFB3, and connect the resistor RFB3 to a voltage at one end of the clamping switch abnormality detection circuit 200 for clamping, which is generally clamped to a positive voltage. Then, the voltage on the auxiliary winding can be detected by detecting the current $I_{FB}$ on the resistor RFB3. Therefore, in the following embodiments, the input of the clamping switch abnormality detection circuit 200 is represented by $V_{FB}/I_{FB}$, and the voltage on the auxiliary winding can be obtained by detecting $V_{FB}$ by means of resistance voltage division detection or detecting $I_{FB}$ by means of current detection.

Figure 4:
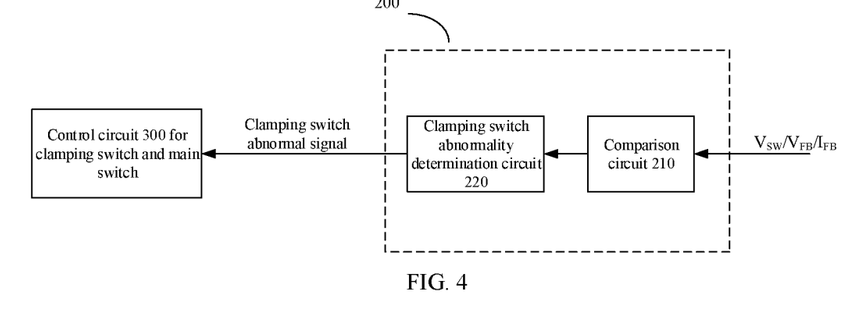
FIG. 4 is a block diagram of the clamping switch abnormality detection circuit 200 in an embodiment.

As shown in FIG. 4, the clamping switch abnormality detection circuit includes the comparison circuit 210 and the clamping switch abnormality determination circuit 220. The output voltage of the clamping switch abnormality determination circuit 220 is a clamping switch abnormal signal. The comparison circuit 210 receives the voltage on the auxiliary winding or the switching node voltage $V_{SW}$. The clamping switch abnormality determination circuit 220 receives the output voltage of the comparison circuit 210 and determines whether the clamping switch and the clamping switch driving circuit are abnormal or not. When the clamping switch or the clamping switch driving circuit is abnormal, the clamping switch abnormal signal is active, otherwise, the clamping switch abnormal signal is inactive. The control circuit for the clamping switch and the main switch receives the clamping switch abnormal signal, and controls turning on and off of the main switch and the clamping switch. In FIG. 4, the comparison circuit 210 receives $V_{FB}/I_{FB}$ to obtain the voltage on the auxiliary winding.

Figure 5:
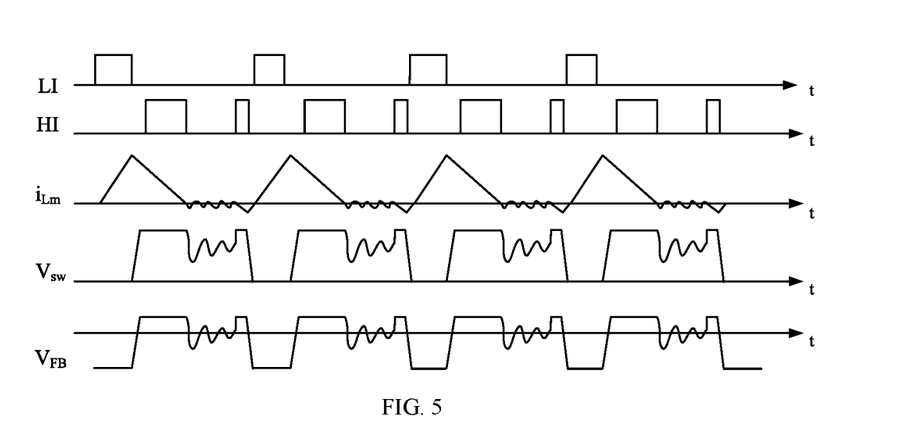
FIG. 5 is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is normal in a case where the active clamping flyback circuit is in discontinuous conduction mode and the clamping switch is turned on twice in one switching cycle.
Figure 6:
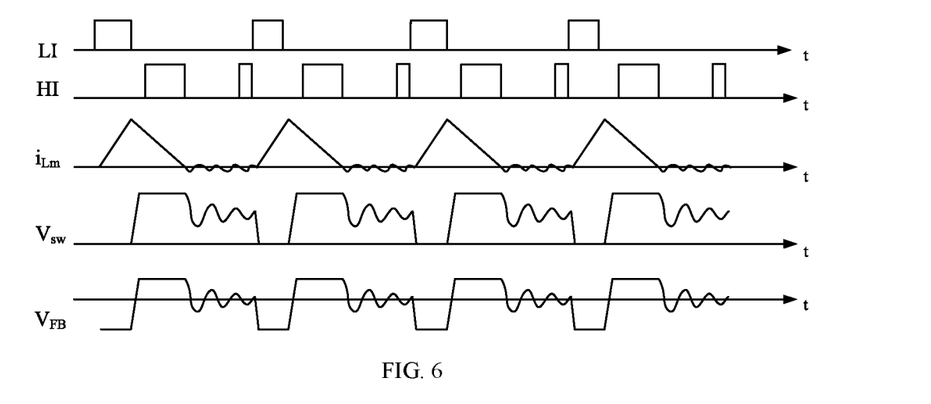
FIG. 6 is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is abnormal in a case where the active clamping flyback circuit is in discontinuous conduction mode and the clamping switch is turned on twice in one switching cycle.

In an embodiment, FIG. 5 shows waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is normal in a case where the active clamping flyback circuit is in discontinuous conduction mode and the clamping switch is turned on twice in one switching cycle. FIG. 6 shows waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is abnormal in a case where the active clamping flyback circuit is in discontinuous conduction mode and the clamping switch is turned on twice in one switching cycle. In FIGS. 5 and 6, the feedback voltage $V_{FB}$ is used to characterize the voltage on the auxiliary winding, and the feedback current may also be used to characterize the voltage on the auxiliary winding or detect the switching node voltage. The active clamping flyback circuit operates in discontinuous conduction mode, and the clamping switch is turned on separately before the main switch is turned on and after the main switch is turned off. When the clamping switch control signal is active before the main switch is turned on, the comparison circuit compares the voltage on the auxiliary winding with the first voltage threshold or compares the switching node voltage with the second voltage threshold. When the switching node voltage for successive Q switching cycles is less than the first voltage threshold, or the voltage on the auxiliary winding is less than the second voltage threshold, the output voltage of the clamping switch abnormality determination circuit is active, thereby determining that the clamping switch or the clamping switch driving circuit is abnormal, wherein Q is a natural number greater than or equal to 1. As shown in FIG. 5, when both the clamping switch and the clamping switch driving circuit are normal, if the clamping switch control signal is active before the main switch is turned on, then the clamping switch is turned on, and the switching node voltage stops oscillating and rises to Vin+N*Vo, where N is a turns ratio of the primary side to the secondary side in the flyback circuit. Since the voltage on the auxiliary winding is $V_{AUX} = (V_{SW}-Vin)*(Np/Naux)$, the voltage on the auxiliary winding may also be obtained by detecting the feedback voltage or the feedback current so as to perform determination. As shown in FIG. 6, when the clamping switch or the clamping switch driving circuit is abnormal, if the clamping switch control signal is active before the main switch is turned on, then the clamping switch is turned on, the switching node voltage continues to oscillate, and the feedback voltage also continues to oscillate.

When Q=1, that is, it only needs that in one switching cycle, the switching node voltage is less than the first voltage threshold, or the voltage on the auxiliary winding is less than the second voltage threshold, then the output voltage of the clamping switch abnormality determination circuit is active, thereby determining that the clamping switch or the clamping switch driving circuit is abnormal; otherwise, the output voltage of the clamping switch abnormality determination circuit is inactive, thereby determining that the clamping switch and the clamping switch driving circuit are normal. When Q is greater than or equal to 2, in order to prevent mis-determination, it is required to detect that the switching node voltage for successive Q switching cycles is less than the first voltage threshold or the voltage on the auxiliary winding is less than the second voltage threshold, then the output voltage of the clamping switch abnormality determination circuit is active, thereby determining that the clamping switch or the clamping switch driving circuit is abnormal.

Figure 7:
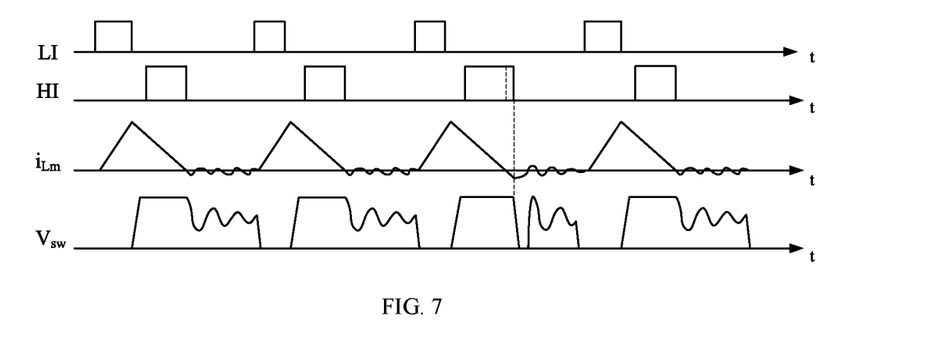
FIG. 7 is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is normal in a case where the active clamping flyback circuit is in discontinuous conduction mode.
Figure 8A:
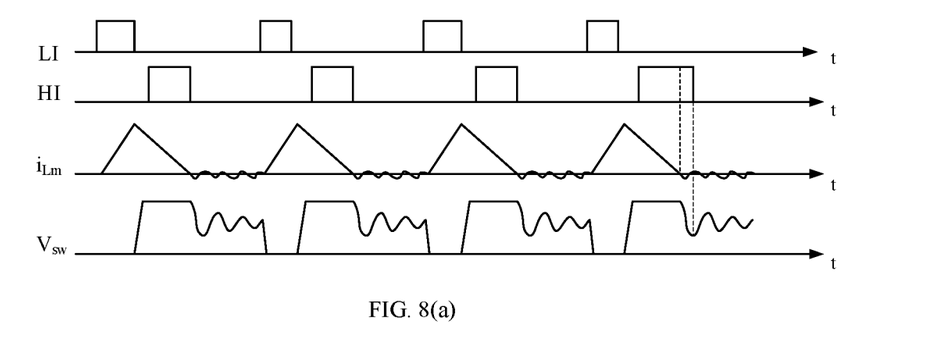
FIG. 8(a) is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is abnormal in a case where the active clamping flyback circuit is in discontinuous conduction mode in a first embodiment.
Figure 8B:
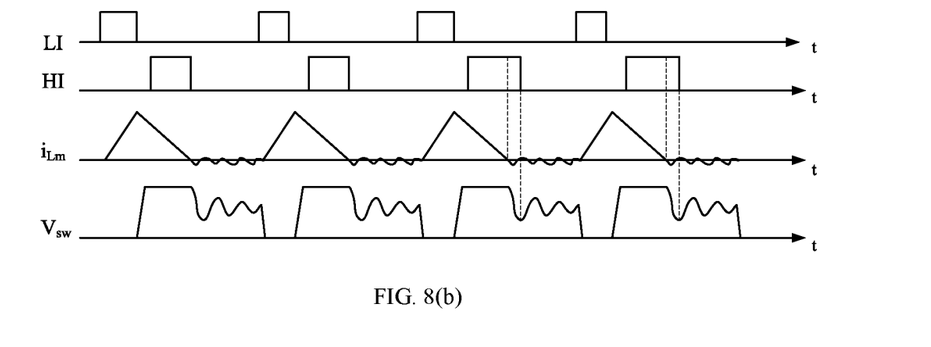
FIG. 8(b) is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is abnormal in a case where the active clamping flyback circuit is in discontinuous conduction mode in a second embodiment.

In an embodiment, please refer to FIGS. 7, 8 (a), and 8 (b). FIG. 7 shows waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is normal in a case where the active clamping flyback circuit is in discontinuous conduction mode. FIGS. 8(a) and 8(b) are in two different embodiments and show waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is abnormal in a case where the active clamping flyback circuit is in discontinuous conduction mode. The active clamping flyback circuit operates in discontinuous conduction mode or critical conduction mode, and the clamping switch control signal changes from inactive to active after the main switch is turned off. In M−1 switching cycles of every M switching cycles, the clamping switch control signal changes from active to inactive in the vicinity of the magnetizing inductor current being zero. In one switching cycle of the every M switching cycles, the clamping switch extended conduction signal outputted by the clamping switch abnormality determination circuit is active, the control circuit for the clamping switch and the main switch receives the clamping switch extended conduction signal and delays a time when the clamping switch changes from active to inactive by a third time. When the clamping switch control signal is active, if the comparison circuit detects that the voltage on the auxiliary winding or the switching node voltage oscillates, or the inductor current detection circuit detects that the magnetizing inductor current oscillates, then the clamping switch abnormal signal is active, thereby determining that the clamping switch is abnormal or the clamping switch driving circuit is abnormal; otherwise, the clamping switch abnormal signal is inactive, thereby determining that the clamping switch and the clamping switch driving circuit are normal. Alternatively, when the clamping switch control signal is active, if the comparison circuit detects that the voltage on the auxiliary winding or the switching node voltage oscillates, or the inductor current detection circuit detects that the magnetizing inductor current oscillates, then in subsequently successive P switching cycles, the time when the clamping switch control signal changes from active to inactive is delayed by the third time. In successive P+1 switching cycles, when the clamping switch control signal is active, if the voltage on the auxiliary winding or the switching node voltage is detected to oscillate, or the inductor current detection circuit detects that the magnetizing inductor current oscillates, then the clamping switch abnormal signal is active, thereby determining that the clamping switch is abnormal or the clamping switch driving circuit is abnormal; where both M and P are natural numbers greater than or equal to 1, and the third time is related to an oscillating period. The clamping switch abnormality determination circuit outputs a clamping switch extended conduction signal, and the control circuit for the clamping switch and the main switch receives the clamping switch extended conduction signal. When the clamping switch extended conduction signal is active, the control circuit for the clamping switch and the main switch delays the time when the clamping switch control signal changes from active to inactive. As shown in FIG. 7, the active time of the clamping switch control signal in the third switching cycle is extended by the third time, and the beginning of the extension of the clamping switch control signal HI is indicated by a dashed line. As shown in FIG. 7, when both the clamping switch and the clamping switch driving circuit are normal, if the clamping switch control signal HI is active, then the switching node voltage does not oscillate, and remains Vin+N*Vo. As shown in FIG. 8(a), when the clamping switch control signal is active, the switching node voltage for one switching cycle oscillates, thereby determining that the clamping switch or the clamping switch driving circuit is abnormal. In order to prevent mis-determination, if the switching node voltage has oscillated when the clamping switch control signal is active for one switching cycle, it is required that the time when the clamping switch control signal changes from active to inactive for successive P switching cycles is delayed by the third time, and in the subsequent P switching cycles, the switching node voltage also oscillates when the clamping switch control signal is active, then it is determined that the clamping switch or the clamping switch driving circuit is abnormal. As shown in FIG. 8(b), when P=1, in the third switching cycle, the switching node voltage has oscillated when the clamping switch control signal for one switching cycle is active, then in the fourth switching cycle, the time when the clamping switch control signal changes from active to inactive continues to be delayed by the third time, and the switching node voltage oscillates when the clamping switch control signal for one switching cycle is active, thereby determining that the clamping switch or the clamping switch driving circuit is abnormal. It should be noted that this circuit and method are also applicable to critical conduction mode. FIGS. 7, 8(a), and 8(b) only illustrate the situation in discontinuous conduction mode. When a duty ratio of the main switch is greater than the first threshold value, abnormality detection of the clamping switch is started.

Figure 9:
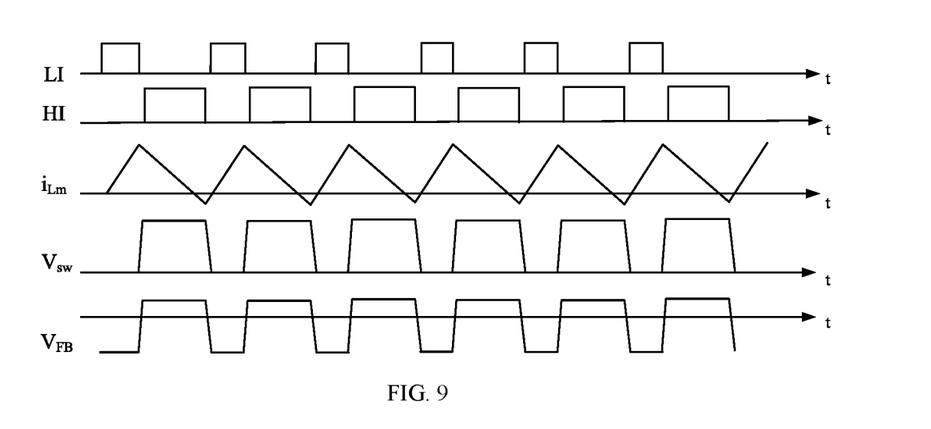
FIG. 9 is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is normal in a case where the active clamping flyback circuit is in critical conduction mode.
Figure 10:
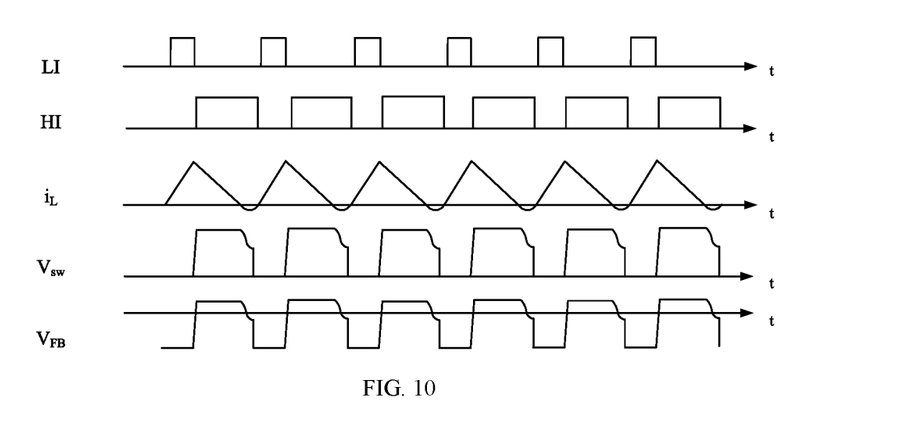
FIG. 10 is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is abnormal in a case where the active clamping flyback circuit is in critical conduction mode.

Please refer to FIGS. 9 and 10. FIG. 9 is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is normal in a case where the active clamping flyback circuit is in critical conduction mode. FIG. 10 is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is abnormal in a case where the active clamping flyback circuit is in critical conduction mode. The active clamping flyback circuit operates in critical conduction mode, and the clamping switch control signal changes from inactive to active after the main switch is turned off. The control circuit for the clamping switch adjusts the time when the clamping switch control signal changes from active to inactive, so that the main switch achieves zero-voltage switching. When the clamping switch control signal is active, the comparison circuit detects the voltage on the auxiliary winding or the switching node voltage, or the inductor current detection circuit detects the magnetizing inductor current. If the voltage on the auxiliary winding does not oscillate or the switching node voltage does not oscillate or the magnetizing inductor current does not oscillate, then the clamping switch abnormal signal is inactive, thereby determining that the clamping switch and the clamping switch driving circuit are normal; otherwise, the clamping switch abnormal signal is active, thereby determining that the clamping switch or the clamping switch driving circuit is abnormal. In critical conduction mode, when both the clamping switch and the clamping switch driving circuit are normal, the main switch can be controlled to achieve zero-voltage switching by controlling the turning-off time of the clamping switch. A specific way of controlling the zero voltage switching is to first preset a time when the clamping switch control signal is active, wherein the time is generally shorter than the turning-on time of the clamping switch under the realization of zero-voltage switching of the main switch; and to detect whether the main switch has zero-voltage switching or not. If there is no zero-voltage switching, the time when the clamping switch changes from active to inactive for the next switching cycle is delayed, and the time when the clamping switch changes from active to inactive stops to be delayed until the zero-voltage switching of the main switch is achieved. If the clamping switch or the clamping switch driving circuit is abnormal, then the time when the clamping switch changes from active to inactive for the next switching cycle is delayed, and the zero voltage switching of the main switch cannot always be achieved. When the time when the clamping switch changes from active to inactive for the next switching cycle is delayed until the magnetizing inductor current is less than zero, the auxiliary winding oscillates when the clamping switch control signal is active.

Figure 11:
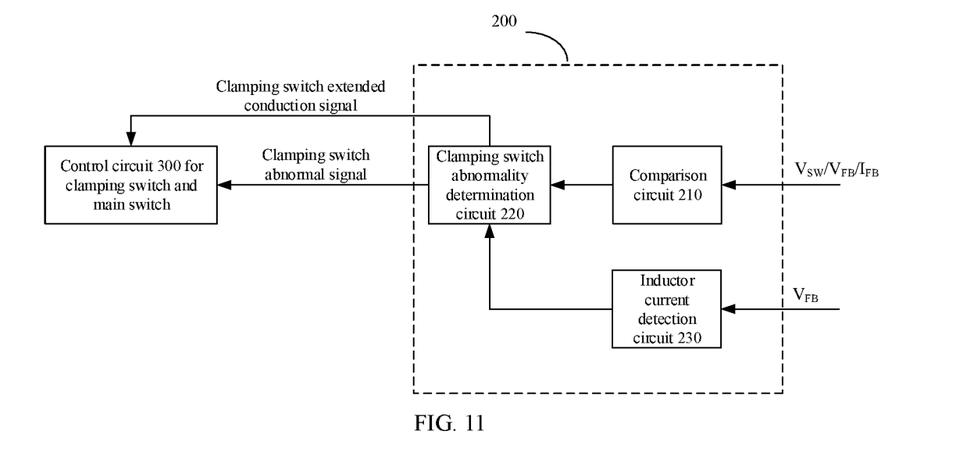
FIG. 11 is a block diagram of the clamping switch abnormality detection circuit 200 in an embodiment.

In an embodiment, as shown in FIG. 11, the clamping switch abnormality detection circuit includes the inductor current detection circuit 230. The inductor current detection circuit receives the voltage on the auxiliary winding and determines whether the inductor current is zero or not according to the voltage on the auxiliary winding. The clamping switch abnormality determination circuit outputs a clamping switch extended conduction signal, and the control circuit for the clamping switch and the main switch receives the clamping switch extended conduction signal. When the clamping switch extended conduction signal is active, the control circuit for the clamping switch and the main switch delays the time when the clamping switch control signal changes from active to inactive.

The active clamping flyback circuit operates in critical conduction mode or discontinuous conduction mode, and the clamping switch control signal HI changes from inactive to active after the main switch is turned off. In every M switching cycles, one switching cycle is that when the inductor current detection circuit detects that the magnetizing inductor current is zero, the control circuit for the clamping switch and the main switch receives the clamping switch extended conduction signal outputted from the clamping switch abnormality determination circuit, and the clamping switch abnormality determination circuit starts timing; and when the timing reaches a first time, the control circuit 300 for the clamping switch and the main switch controls the clamping switch control signal HI to change from active to inactive, and the timing is ended. During the timing, the comparison circuit detects the voltage on the auxiliary winding or the switching node voltage, and if the voltage on the auxiliary winding or the switching node voltage is detected to oscillate, or the inductor current detection circuit detects that the magnetizing inductor current oscillates, then the clamping switch abnormal signal is active, thereby determining that the clamping switch is abnormal or the clamping switch driving circuit is abnormal; otherwise, the clamping switch abnormal signal is inactive, thereby determining that the clamping switch and the clamping switch driving circuit are normal. Alternatively, during the timing, the comparison circuit detects the voltage on the auxiliary winding or the switching node voltage, and if the voltage on the auxiliary winding or the switching node voltage is detected to oscillate, or the inductor current detection circuit detects that the magnetizing inductor current oscillates, then in subsequently successive P switching cycles, the clamping switch control signal changes from inactive to active after the main switch is turned off. When the inductor current detection circuit detects that the magnetizing inductor current is zero, the clamping switch abnormality determination circuit starts timing, and when the timing reaches the first time, the control circuit for the clamping switch and the main switch controls the clamping switch control signal to change from active to inactive, and the timing is ended. In successive P+1 switching cycles, during the timing, the voltage on the auxiliary winding or the switching node voltage is detected, and if the voltage on the auxiliary winding or the switching node voltage is detected to oscillate, or the inductor current detection circuit detects that the magnetizing inductor current oscillates, then the clamping switch abnormal signal is active, thereby determining that the clamping switch is abnormal or the clamping switch driving circuit is abnormal; where both M and P are natural numbers greater than or equal to 1.

Figure 12:
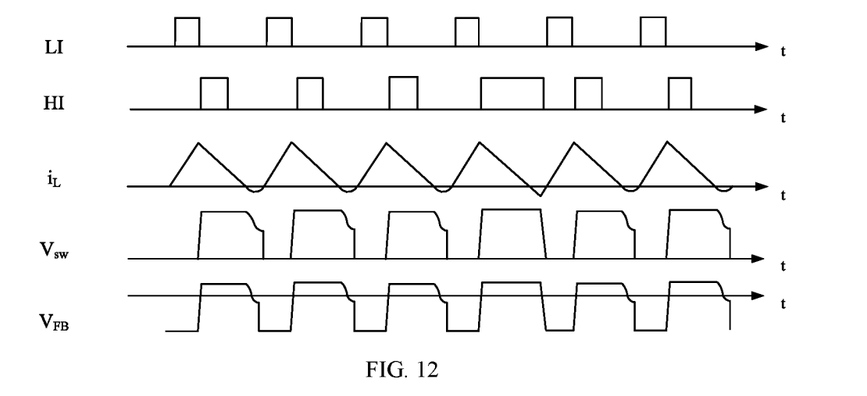
FIG. 12 is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is normal in a case where the active clamping flyback circuit is in critical conduction mode in an embodiment.
Figure 13:
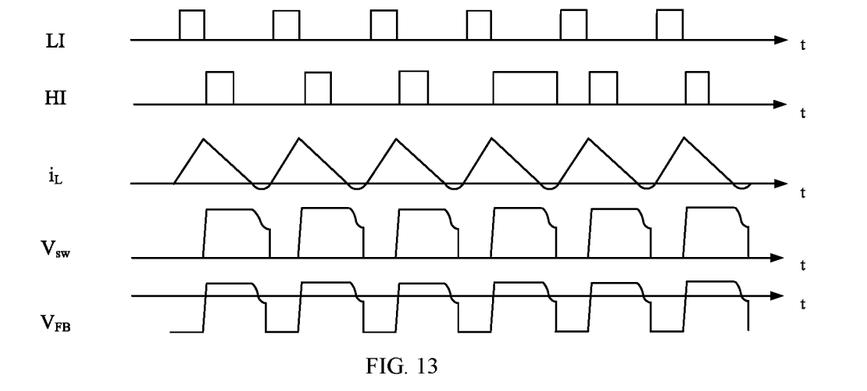
FIG. 13 is waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is abnormal in a case where the active clamping flyback circuit is in critical conduction mode in an embodiment.

FIG. 12 shows waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is normal in a case where the active clamping flyback circuit is in critical conduction mode. FIG. 13 shows waveform diagrams of the main switch control signal LI, the clamping switch control signal HI, the magnetizing inductor current $i_{LM}$, the switching node voltage $V_{SW}$ and the feedback voltage $V_{FB}$ when the clamping switch is abnormal in a case where the active clamping flyback circuit is in critical conduction mode. In M cycles, the clamping switch control signal of M-1 switching cycles can change from active to inactive when the magnetizing inductor current is greater than zero, and one switching cycles changes from active to inactive when the magnetizing inductor current is less than zero, thereby determining whether the clamping switch and the clamping switch driving circuit are normal or not.

In order to prevent mis-determination, if the switching node voltage has oscillated during the extended conduction of one switching cycle, it is required to delay the time when the clamping switch control signal changes from active to inactive for the subsequently successive P switching cycles until the magnetizing inductor current is negative, and in the subsequently successive P switching cycles, the switching node voltage also oscillates during the extended conduction, thereby determining that the clamping switch or the clamping switch driving circuit is abnormal.

Figure 14:
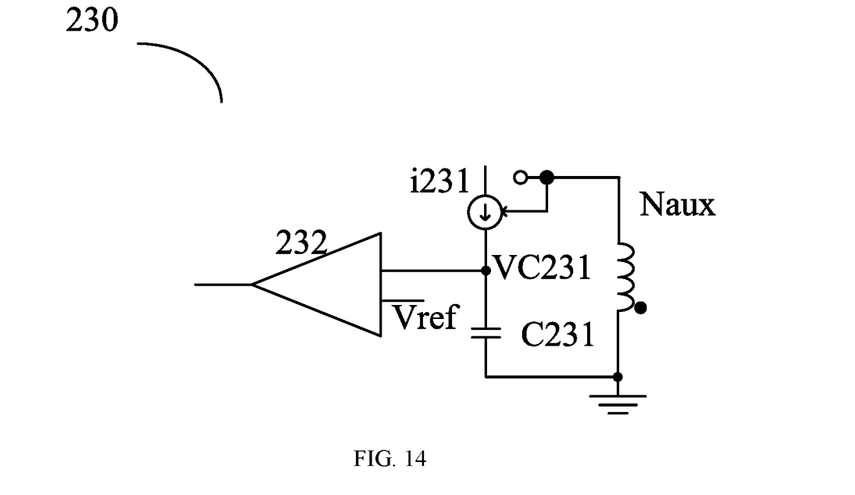
FIG. 14 is an embodiment of the inductor current detection circuit 230.

FIG. 14 shows an embodiment of the inductor current detection circuit. The information on the magnetizing inductor current can be obtained by detecting the voltage on the auxiliary winding. In the above embodiment, the information of the magnetizing inductor current crossing zero is required. Due to operating in critical conduction mode, when the main switch is from off to on, the magnetizing inductor current is near zero, and volt-second integration of the magnetizing inductor voltage is performed over time. When the main switch is turned on, the magnetizing inductor current rises, and the volt-second integral rises. When the main switch is turned off, the magnetizing inductor current drops, and the volt-second integral drops. When the magnetizing inductor current drops to zero, the volt-second integral is also zero. Therefore, the point where the magnetizing inductor current is zero can be determined by means of volt-second integration. Since the ratio of the voltage on the auxiliary winding to the voltage on the magnetizing inductor is equal to the turn ratio of the auxiliary winding to the magnetizing inductor, the information on the magnetizing inductor current can be obtained by detecting the voltage on the auxiliary winding and performing volt-second integration. The current source i231 is a voltage-controlled current source. A current magnitude of the current source i231 is controlled by the voltage $V_{AUX}$ on the auxiliary winding, and is generally a fixed proportion of the voltage on the auxiliary winding. The controlled current source i231 charges and discharges the capacitor C231. In a first embodiment, when the main switch is turned on, if the magnetizing inductor current rises, then the controlled current source i231 charges the capacitor C231, and the voltage on the capacitor C231 starts to rise from Vref; and when the main switch is turned off, if the magnetizing inductor current drops, then the controlled current source i231 discharges the capacitor C231, and the voltage on the capacitor C231 drops. The comparator 232 compares the voltage VC231 on the capacitor C231 and the reference voltage Vref, and when VC231 drops to Vref, the comparator flips to characterize that the magnetizing inductor current crosses zero. In a second embodiment, alternatively, when the main switch is turned on, if the magnetizing inductor current rises, then the controlled current source i231 discharges the capacitor C231; and when the main switch is turned off, if the magnetizing inductor current drops, then the controlled current source i231 charges the capacitor C231.

As shown in FIG. 2, the active clamping flyback circuit includes the clamping capacitor CSA, and the voltage on the clamping capacitor is the clamping voltage VC. When the clamping voltage VC or the output voltage Vo is greater than a fifth voltage threshold, abnormality detection of the clamping switch is started.

When the clamping switch or the clamping switch driving circuit is abnormal, the control circuit 300 for the clamping switch and the main switch turns off both the main switch M1 and the clamping switch MSA. After a time when both the main switch M1 and the clamping switch MSA are turned off reaches a fourth time, the control circuit 300 for the clamping switch and the main switch controls the main switch M1 and the clamping switch MSA to be turned on again. Alternatively, when the clamping switch or the clamping switch driving circuit is abnormal, the control circuit 300 for the clamping switch and the main switch turns off both the main switch M1 and the clamping switch MSA, and when being powered on again, the control circuit 300 for the clamping switch and the main switch controls the main switch M1 and the clamping switch MSA to be turned on.

It should be noted that, in the first embodiment, being active corresponds to a high level, and being inactive corresponds to a low level; and in the second embodiment, being active corresponds to a low level, and being inactive corresponds to a high level.

The present invention further provides a clamping switch abnormality detection circuit, wherein an active clamping flyback circuit includes a clamping switch, a main switch and a transformer. When a clamping switch control signal is active, the clamping switch abnormality detection circuit detects a switching node voltage or a voltage on an auxiliary winding or a magnetizing inductor current, and if the switching node voltage or the voltage on the auxiliary winding or the magnetizing inductor current oscillates, or the switching node voltage is less than a first voltage threshold or the voltage on the auxiliary winding is less than a second voltage threshold, then the clamping switch abnormality detection circuit determines that the clamping switch is abnormal or a clamping switch driving circuit is abnormal. The switching node is a common node of the transformer and the main switch. The transformer includes a primary winding, a secondary winding, and an auxiliary winding.

The voltage on the auxiliary winding is divided to obtain a feedback voltage characterizing the voltage on the auxiliary winding. Alternatively, the clamping switch abnormality detection circuit is connected to the auxiliary winding through a first resistor to obtain a feedback current characterizing the voltage on the auxiliary winding.

In an embodiment, the clamping switch abnormality detection circuit includes a comparison circuit and a clamping switch abnormality determination circuit. The output voltage of the clamping switch abnormality determination circuit is a clamping switch abnormal signal. The comparison circuit receives the voltage on the auxiliary winding or the switching node voltage. The clamping switch abnormality determination circuit receives the output voltage of the comparison circuit and determines whether the clamping switch and the clamping switch driving circuit are abnormal or not. When the clamping switch or the clamping switch driving circuit is abnormal, the clamping switch abnormal signal is active; otherwise, the clamping switch abnormal signal is inactive. A control circuit for the clamping switch and the main switch receives the clamping switch abnormal signal, and controls turning on and off of the main switch and the clamping switch.

In an embodiment, the active clamping flyback circuit operates in discontinuous conduction mode, and the clamping switch is turned on separately before the main switch is turned on and after the main switch is turned off. When the clamping switch control signal is active before the main switch is turned on, the comparison circuit compares the voltage on the auxiliary winding with the first voltage threshold or compares the switching node voltage with the second voltage threshold. When the switching node voltage for successive Q switching cycles is less than the first voltage threshold, or the voltage on the auxiliary winding is less the second voltage threshold, then the output voltage of the clamping switch abnormality determination circuit is active, thereby determining that the clamping switch or the clamping switch driving circuit is abnormal, wherein Q is a natural number greater than or equal to 1.

In an embodiment, the clamping switch abnormality detection circuit includes an inductor current detection circuit. The inductor current detection circuit receives the voltage on the auxiliary winding, and determines whether an inductor current is zero or not according to the voltage on the auxiliary winding. The clamping switch abnormality determination circuit outputs a clamping switch extended conduction signal, and the control circuit for the clamping switch and the main switch receives the clamping switch extended conduction signal. When the clamping switch extended conduction signal is active, the control circuit for the clamping switch and the main switch delays the time when the clamping switch control signal changes from active to inactive.

The active clamping flyback circuit operates in critical conduction mode or discontinuous conduction mode, and the clamping switch control signal changes from inactive to active after the main switch is turned off. In every M switching cycles, one switching cycle is that when the inductor current detection circuit detects that the magnetizing inductor current is zero, the control circuit for the clamping switch and the main switch receives the clamping switch extended conduction signal outputted from the clamping switch abnormality determination circuit, and the clamping switch abnormality determination circuit starts timing; and when the timing reaches the first time, the control circuit for the clamping switch and the main switch controls the clamping switch control signal to change from active to inactive, and the timing is ended.

During the timing, the comparison circuit detects the voltage on the auxiliary winding or the switching node voltage, and if the voltage on the auxiliary winding or the switching node voltage is detected to oscillate, or the inductor current detection circuit detects that the magnetizing inductor current oscillates, then the clamping switch abnormal signal is active, thereby determining that the clamping switch is abnormal or the clamping switch driving circuit is abnormal; otherwise, the clamping switch abnormal signal is inactive, thereby determining the clamping switch and the clamping switch driving circuit are normal.

Alternatively, during the timing, the comparison circuit detects the voltage on the auxiliary winding or the switching node voltage, and if the voltage on the auxiliary winding or the switching node voltage is detected to oscillate, or the inductor current detection circuit detects that the magnetizing inductor current oscillates, then in subsequently successive P switching cycles, the clamping switch control signal changes from inactive to active after the main switch is turned off. When the inductor current detection circuit detects that the magnetizing inductor current is zero, the clamping switch abnormality determination circuit starts timing, and when the timing reaches the first time, the control circuit for the clamping switch and the main switch controls the clamping switch control signal to change from active to inactive, and the timing is ended. In successive P+1 switching cycles, during the timing, the voltage on the auxiliary winding or the switching node voltage is detected, and if the voltage on the auxiliary winding or the switching node voltage is detected to oscillate, or the inductor current detection circuit detects that the magnetizing inductor current oscillates, then the clamping switch abnormal signal is active, thereby determining the clamping switch is abnormal or the clamping switch driving circuit is abnormal.

Specifically, both M and P are natural numbers greater than or equal to 1.

In an embodiment, the active clamping flyback circuit operates in critical conduction mode, and the clamping switch control signal changes from inactive to active after the main switch is turned off. The control circuit for the clamping switch adjusts the time when the clamping switch control signal changes from active to inactive, so that the main switch achieves zero-voltage switching. When the clamping switch control signal is active, the comparison circuit detects the voltage on the auxiliary winding or the switching node voltage, or the inductor current detection circuit detects the magnetizing inductor current. If the voltage on the auxiliary winding does not oscillate or the switching node voltage does not oscillate or the magnetizing inductor current does not oscillate, then the clamping switch abnormal signal is inactive, thereby determining that the clamping switch and the clamping switch driving circuit are normal; otherwise, the clamping switch abnormal signal is active, thereby determining that the clamping switch or the clamping switch driving circuit is abnormal.

In an embodiment, the clamping switch abnormality determination circuit outputs a clamping switch extended conduction signal, and the control circuit for the clamping switch and the main switch receives the clamping switch extended conduction signal. When the clamping switch extended conduction signal is active, the control circuit for the clamping switch and the main switch delays the time when the clamping switch control signal changes from active to inactive.

The active clamping flyback circuit operates in critical conduction mode or discontinuous conduction mode, and the clamping switch control signal changes from inactive to active after the main switch is turned off. In M−1 cycles of every M switching cycles, the clamping switch control signal changes from active to inactive in the vicinity of the magnetizing inductor current being zero. In one switching cycle of the every M switching cycles, the clamping switch extended conduction signal is active, the time when the clamping switch control signal changes from active to inactive is delayed by a third time. When the clamping switch control signal is active, if the comparison circuit detects that the voltage on the auxiliary winding or the switching node voltage oscillates, or the inductor current detection circuit detects that the magnetizing inductor current oscillates, then the clamping switch abnormal signal is active, thereby determining that the clamping switch is abnormal or the clamping switch driving circuit is abnormal; otherwise, the clamping switch abnormal signal is inactive, thereby determining that the clamping switch and the clamping switch driving circuit are normal.

Alternatively, when the clamping switch control signal is active, if the comparison circuit detects that the voltage on the auxiliary winding or the switching node voltage oscillates, or the inductor current detection circuit detects that the magnetizing inductor current oscillates, then in subsequently successive P switching cycles, the time when the clamping switch control signal changes from active to inactive is delayed by the third time. In successive P+1 switching cycles, when the clamping switch control signal is active, if the voltage on the auxiliary winding or the switching node voltage is detected to oscillate, or the inductor current detection circuit detects that the magnetizing inductor current oscillates, then the clamping switch abnormal signal is active, thereby determining that the clamping switch is abnormal or the clamping switch driving circuit is abnormal.

Specifically, both M and P are natural numbers greater than or equal to 1.

In an embodiment, when a duty ratio of the main switch is greater than the first threshold value, the clamping switch abnormality detection circuit is started.

In an embodiment, the active clamping flyback circuit includes a clamping capacitor, and a voltage on the clamping capacitor is a clamping voltage. When the clamping voltage or an output voltage is greater than a fifth voltage threshold, abnormality detection of the clamping switch is started.

In an embodiment, when the clamping switch or the clamping switch driving circuit is abnormal, the control circuit for the clamping switch and the main switch turns off both the main switch and the clamping switch. After a time when both the main switch and the clamping switch are turned off reaches a fourth time, the control circuit for the clamping switch and the main switch controls the main switch and the clamping switch to be turned on again. Alternatively, when the clamping switch or the clamping switch driving circuit is abnormal, the control circuit for the clamping switch and the main switch turns off both the main switch and the clamping switch, and when being powered on again, the control circuit for the clamping switch and the main switch controls the main switch and the clamping switch to be turned on.

The present invention further provides an active clamping flyback circuit, including the clamping switch abnormality detection method or the clamping switch abnormality detection circuit described above.

Although the embodiments are separately illustrated and described above, the embodiments are related to some common technologies. In the view of those skilled in the art, replacements and integrations between the embodiments may be performed. With regard to what is not clearly recorded in one of the embodiments, reference may be made to another documented embodiment.

The embodiments described above do not constitute a limitation on the protective scope of the technical solution of the present invention. Any modification, equivalent replacement, and improvement made within the spirit and principle of the above-mentioned embodiments shall fall within the protective scope of the technical solution of the present invention.

What is claimed is:

1. A clamping switch abnormality detection method, wherein an active clamping flyback circuit comprises a clamping switch, a main switch and a transformer; when a clamping switch control signal is active, detecting a switching node voltage or a voltage on an auxiliary winding or a magnetizing inductor current, wherein when the switching node voltage or the voltage on the auxiliary winding or the magnetizing inductor current oscillates, or the switching node voltage is less than a first voltage threshold or the voltage on the auxiliary winding is less than a second voltage threshold, the clamping switch is abnormal or a clamping switch driving circuit is abnormal; a switching node is a common node of the transformer and the main switch; the transformer comprises a primary winding, a secondary winding and the auxiliary winding; and wherein, the voltage on the auxiliary winding is divided to obtain a feedback voltage characterizing the voltage on the auxiliary winding; alternatively, the auxiliary winding is connected on a first resistor to obtain a feedback current characterizing the voltage on the auxiliary winding, wherein in every M switching cycles, one switching cycle is that when the magnetizing inductor current is zero, timing is started, and when the timing reaches a first time, the clamping switch control signal changes from active to inactive, and the timing is ended.

2. The clamping switch abnormality detection method according to claim 1, wherein, the active clamping flyback circuit operates in discontinuous conduction mode, and the clamping switch is turned on separately before the main switch is turned on and after the main switch is turned off; the voltage on the auxiliary winding or the switching node voltage is detected when the clamping switch control signal is active before the main switch is turned on; when the switching node voltage for successive Q switching cycles is less than the first voltage threshold, or the voltage on the auxiliary winding is less than the second voltage threshold, the clamping switch or the clamping switch driving circuit is abnormal, wherein Q is a natural number greater than or equal to 1.

3. The clamping switch abnormality detection method according to claim 2, wherein, the active clamping flyback circuit comprises a clamping capacitor, and a voltage on the clamping capacitor is a clamping voltage; when the clamping voltage or an output voltage of the active clamping flyback circuit is greater than a fifth voltage threshold, an abnormality detection of the clamping switch is started.

4. The clamping switch abnormality detection method according to claim 1, wherein, the active clamping flyback circuit operates in critical conduction mode or discontinuous conduction mode, and the clamping switch control signal changes from inactive to active after the main switch is turned off;
during the timing, the voltage on the auxiliary winding or the switching node voltage is detected, and when the voltage on the auxiliary winding or the switching node voltage or the magnetizing inductor current is detected to oscillate, the clamping switch is abnormal or the clamping switch driving circuit is abnormal, otherwise the clamping switch and the clamping switch driving circuit are normal;
alternatively, during the timing, the voltage on the auxiliary winding or the switching node voltage or the magnetizing inductor current is detected, and when the voltage on the auxiliary winding or the switching node voltage or the magnetizing inductor current is detected to oscillate, in subsequent P switching cycles, the clamping switch control signal changes from inactive to active after the main switch is turned off; when the magnetizing inductor current is zero, the timing is started, and when the timing reaches the first time, the clamping switch control signal changes from active to inactive, and the timing is ended; in successive P+1 switching cycles, during the timing, the voltage on the auxiliary winding or the switching node voltage or the magnetizing inductor current is detected, and when the voltage on the auxiliary winding or the switching node voltage or the magnetizing inductor current is detected to oscillate, the clamping switch is abnormal or the clamping switch driving circuit is abnormal;
wherein both M and P are natural numbers greater than or equal to 1.

5. The clamping switch abnormality detection method according to claim 4, wherein, the active clamping flyback circuit comprises a clamping capacitor, and a voltage on the clamping capacitor is a clamping voltage; when the clamping voltage or an output voltage of the active clamping flyback circuit is greater than a fifth voltage threshold, an abnormality detection of the clamping switch is started.

6. The clamping switch abnormality detection method according to claim 1, wherein, the active clamping flyback circuit operates in critical conduction mode, and the clamping switch control signal changes from inactive to active after the main switch is turned off; adjusting a time when the clamping switch control signal changes from active to inactive, so that the main switch achieves zero-voltage switching; when the clamping switch control signal is active, detecting the voltage on the auxiliary winding or the switching node voltage or the magnetizing inductor current, wherein when the voltage on the auxiliary winding does not oscillate or the switching node voltage does not oscillate or the magnetizing inductor current does not oscillate, the clamping switch and the clamping switch driving circuit are normal, otherwise the clamping switch or the clamping switch driving circuit is abnormal.

7. The clamping switch abnormality detection method according to claim 1, wherein, the active clamping flyback circuit operates in critical conduction mode or discontinuous conduction mode, and the clamping switch control signal changes from inactive to active after the main switch is turned off; in M−1 cycles of the every M switching cycles, the clamping switch control signal changes from active to inactive in a vicinity of the magnetizing inductor current being zero; in one switching cycle of the every M switching cycles, delaying a time when the clamping switch control signal changes from active to inactive by a third time, wherein when the clamping switch control signal is active, and when the voltage on the auxiliary winding or the switching node voltage or the magnetizing inductor current is detected to oscillate, the clamping switch is abnormal or the clamping switch driving circuit is abnormal, otherwise the clamping switch and the clamping switch driving circuit are normal;
alternatively, when the clamping switch control signal is active, and when the voltage on the auxiliary winding or the switching node voltage or the magnetizing inductor current is detected to oscillate, in subsequently successive P switching cycles, the time when the clamping switch control signal changes from active to inactive is delayed by the third time; in successive P+1 switching cycles, when the clamping switch control signal is active, when the voltage on the auxiliary winding or the switching node voltage or the magnetizing inductor current is detected to oscillate, the clamping switch is abnormal or the clamping switch driving circuit is abnormal;
wherein M and P are natural numbers greater than or equal to 1.

8. The clamping switch abnormality detection method according to claim 7, when a duty ratio of the main switch is greater than a first threshold value, starting abnormality detection of the clamping switch.

9. The clamping switch abnormality detection method according to claim 1, wherein, the active clamping flyback circuit comprises a clamping capacitor, and a voltage on the clamping capacitor is a clamping voltage; when the clamping voltage or an output voltage of the active clamping flyback circuit is greater than a fifth voltage threshold, an abnormality detection of the clamping switch is started.

10. The clamping switch abnormality detection method according to claim 1, wherein, when the clamping switch or the clamping switch driving circuit is abnormal, both the main switch and the clamping switch are turned off; after a time when both the main switch and the clamping switch are turned off reaches a fourth time, the main switch and the clamping switch are controlled to be turned on again; alternatively, when the clamping switch or the clamping switch driving circuit is abnormal, both the main switch and the clamping switch are turned off, and when being powered on again, the main switch and the clamping switch are controlled to be turned on.

11. A clamping switch abnormality detection circuit, wherein an active clamping flyback circuit comprises a clamping switch, a main switch and a transformer; when a clamping switch control signal is active, the clamping switch abnormality detection circuit detects a switching node voltage or a voltage on an auxiliary winding or a magnetizing inductor current; when the switching node voltage or the voltage on the auxiliary winding or the magnetizing inductor current oscillates, or the switching node voltage is less than a first voltage threshold or the voltage on the auxiliary winding is less than a second voltage threshold, the clamping switch abnormality detection circuit determines that the clamping switch is abnormal or a clamping switch driving circuit is abnormal; a switching node is a common node of the transformer and the main switch; the transformer comprises a primary winding, a secondary winding and the auxiliary winding;
    a comparison circuit and a clamping switch abnormality determination circuit; and
    the voltage on the auxiliary winding is divided to obtain a feedback voltage characterizing the voltage on the auxiliary winding; alternatively, the clamping switch abnormality detection circuit is connected to the auxiliary winding through a first resistor to obtain a feedback current characterizing the voltage on the auxiliary winding.

12. The clamping switch abnormality detection circuit according to claim 11, wherein, the clamping switch abnormality detection circuit comprises an output voltage of the clamping switch abnormality determination circuit is a clamping switch abnormal signal; the comparison circuit receives a voltage on the auxiliary winding or the switching node voltage; the clamping switch abnormality determination circuit receives an output voltage of the comparison circuit and determines whether the clamping switch and the clamping switch driving circuit are abnormal or not; when the clamping switch or the clamping switch driving circuit is abnormal, the clamping switch abnormal signal is active, otherwise the clamping switch abnormal signal is inactive; and a control circuit for the clamping switch and the main switch receives the clamping switch abnormal signal, and controls turning on and off of the main switch and the clamping switch.

13. The clamping switch abnormality detection circuit according to claim 12, wherein, the active clamping flyback circuit operates in discontinuous conduction mode, and the clamping switch is turned on separately before the main switch is turned on and after the main switch is turned off; when the clamping switch control signal is active before the main switch is turned on, the comparison circuit compares the voltage on the auxiliary winding with the first voltage threshold, or compares the switching node voltage with the second voltage threshold; when the switching node voltage for successive Q switching cycles is less than the first voltage threshold, or the voltage on the auxiliary winding is less than the second voltage threshold, the output voltage of the clamping switch abnormality determination circuit is active, thereby determining that the clamping switch or the clamping switch driving circuit is abnormal, wherein Q is a natural number greater than or equal to 1.

14. The clamping switch abnormality detection circuit according to claim 12, wherein, the clamping switch abnormality detection circuit comprises an inductor current detection circuit; the inductor current detection circuit receives the voltage on the auxiliary winding, and determines whether the magnetizing inductor current is zero or not according to the voltage on the auxiliary winding; the clamping switch abnormality determination circuit outputs a clamping switch extended conduction signal, and the control circuit for the clamping switch and the main switch receives the clamping switch extended conduction signal; when the clamping switch extended conduction signal is active, the control circuit for the clamping switch and the main switch delays a time when the clamping switch control signal changes from active to inactive;
    the active clamping flyback circuit operates in critical conduction mode or discontinuous conduction mode, and the clamping switch control signal changes from inactive to active after the main switch is turned off; in every M switching cycles, one of the M switching cycles is that when the inductor current detection circuit detects that the magnetizing inductor current is zero, the control circuit for the clamping switch and the main switch receives the clamping switch extended conduction signal outputted from the clamping switch abnormality determination circuit, and the clamping switch abnormality determination circuit starts timing, and when the timing reaches a first time, the control circuit for the clamping switch and the main switch controls the clamping switch control signal to change from active to inactive, and the timing is ended;
    during the timing, the comparison circuit detects the voltage on the auxiliary winding or the switching node voltage, and when the voltage on the auxiliary winding or the switching node voltage is detected to oscillate, or the inductor current detection circuit detects that the magnetizing inductor current oscillates, the clamping switch abnormal signal is active, thereby determining that the clamping switch is abnormal or the clamping switch driving circuit is abnormal; otherwise, the clamping switch abnormal signal is inactive, thereby determining the clamping switch and the clamping switch driving circuit are normal;
    alternatively, during the timing, the comparison circuit detects the voltage on the auxiliary winding or the switching node voltage, and when the voltage on the auxiliary winding or the switching node voltage is detected to oscillate, or the inductor current detection circuit detects that the magnetizing inductor current oscillates, in subsequently successive P switching cycles, the clamping switch control signal changes from inactive to active after the main switch is turned off; when the inductor current detection circuit detects that the magnetizing inductor current is zero, the clamping switch abnormality determination circuit starts timing, and when the timing reaches the first time, the control circuit for the clamping switch and the main switch controls the clamping switch control signal to change from active to inactive, and the timing is ended; in successive P+1 switching cycles, during the timing, the voltage on the auxiliary winding or the switching node voltage is detected, and when the voltage on the auxiliary winding or the switching node voltage is detected to oscillate, or the inductor current detection circuit detects that the magnetizing inductor current oscillates, the clamping switch abnormal signal is active, thereby determining the clamping switch is abnormal or the clamping switch driving circuit is abnormal;

wherein both M and P are natural numbers greater than or equal to 1.

15. The clamping switch abnormality detection circuit according to claim 12, wherein, the active clamping flyback circuit operates in critical conduction mode, and the clamping switch control signal changes from inactive to active after the main switch is turned off; the control circuit for the clamping switch and the main switch adjusts the time when the clamping switch control signal changes from active to inactive, so that the main switch achieves zero-voltage switching; when the clamping switch control signal is active, the comparison circuit detects the voltage on the auxiliary winding or the switching node voltage, or the inductor current detection circuit detects the magnetizing inductor current; when the voltage on the auxiliary winding does not oscillate or the switching node voltage does not oscillate or the magnetizing inductor current does not oscillate, the clamping switch abnormal signal is inactive, thereby determining that the clamping switch and the clamping switch driving circuit are normal, otherwise the clamping switch abnormal signal is active, thereby determining that the clamping switch or the clamping switch driving circuit is abnormal.

16. The clamping switch abnormality detection circuit according to claim 12, wherein, the clamping switch abnormality determination circuit outputs a clamping switch extended conduction signal, and the control circuit for the clamping switch and the main switch receives the clamping switch extended conduction signal; when the clamping switch extended conduction signal is active, the control circuit for the clamping switch and the main switch delays the time when the clamping switch control signal changes from active to inactive;

the active clamping flyback circuit operates in critical conduction mode or discontinuous conduction mode, and the clamping switch control signal changes from inactive to active after the main switch is turned off; in M−1 cycles of every M switching cycles, the clamping switch control signal changes from active to inactive in the vicinity of the magnetizing inductor current being zero; in one switching cycle of the every M switching cycles, the clamping switch extended conduction signal is active, the time when the clamping switch control signal changes from active to inactive is delayed by a third time; when the clamping switch control signal is active, and when the comparison circuit detects that the voltage on the auxiliary winding or the switching node voltage oscillates, or the inductor current detection circuit detects that the magnetizing inductor current oscillates, the clamping switch abnormal signal is active, thereby determining that the clamping switch is abnormal or the clamping switch driving circuit is abnormal, otherwise the clamping switch abnormal signal is inactive, thereby determining that the clamping switch and the clamping switch driving circuit are normal;

alternatively, when the clamping switch control signal is active, when the comparison circuit detects that the voltage on the auxiliary winding or the switching node voltage oscillates, or the inductor current detection circuit detects that the magnetizing inductor current oscillates, in subsequently successive P switching cycles, the time when the clamping switch control signal changes from active to inactive is delayed by the third time; in successive P+1 switching cycles, when the clamping switch control signal is active, and when the voltage on the auxiliary winding or the switching node voltage is detected to oscillate, or the inductor current detection circuit detects that the magnetizing inductor current oscillates, the clamping switch abnormal signal is active, thereby determining that the clamping switch is abnormal or the clamping switch driving circuit is abnormal;

wherein both M and P are natural numbers greater than or equal to 1.

17. The clamping switch abnormality detection circuit according to claim 16, wherein, when a duty ratio of the main switch is greater than a first threshold value, the clamping switch abnormality detection circuit is started.

18. The clamping switch abnormality detection circuit according to claim 11, wherein, the active clamping flyback circuit comprises a clamping capacitor, and a voltage on the clamping capacitor is a clamping voltage; when the clamping voltage or an output voltage of the active clamping flyback circuit is greater than a fifth voltage threshold, an abnormality detection of the clamping switch is started.

19. The clamping switch abnormality detection circuit according 11, wherein, when the clamping switch or the clamping switch driving circuit is abnormal, the control circuit for the clamping switch and the main switch turns off both the main switch and the clamping switch; after a time when both the main switch and the clamping switch are turned off reaches a fourth time, the control circuit for the clamping switch and the main switch controls the main switch and the clamping switch to be turned on again; alternatively, when the clamping switch or the clamping switch driving circuit is abnormal, the control circuit for the clamping switch and the main switch turns off both the main switch and the clamping switch, and when being powered on again, the control circuit for the clamping switch and the main switch controls the main switch and the clamping switch to be turned on.

20. A switch circuit, comprising the clamping switch abnormality detection circuit according to claim 11.

\* \* \* \* \*